(12) United States Patent
Smith

(10) Patent No.: US 9,382,941 B2
(45) Date of Patent: Jul. 5, 2016

(54) BEARING RETAINER

(71) Applicant: Romax Technology Limited, Nottingham (GB)

(72) Inventor: Richard Smith, Nottingham (GB)

(73) Assignee: Romax Technology Limited, Nottingham (GB)

(*) Notice: Subject to any disclaimer, the term of this patent is extended or adjusted under 35 U.S.C. 154(b) by 0 days.

(21) Appl. No.: 13/868,265

(22) Filed: Apr. 23, 2013

(65) Prior Publication Data

US 2014/0199004 A1   Jul. 17, 2014

(30) Foreign Application Priority Data

Jan. 16, 2013  (GB) .................................. 1300746.3

(51) Int. Cl.
| | |
|---|---|
| *F16C 33/66* | (2006.01) |
| *F16C 25/08* | (2006.01) |
| *F16C 35/067* | (2006.01) |
| *B23P 6/00* | (2006.01) |
| *F16C 25/06* | (2006.01) |
| *F16C 19/38* | (2006.01) |

(52) U.S. Cl.
CPC . *F16C 25/08* (2013.01); *B23P 6/00* (2013.01); *F16C 25/06* (2013.01); *F16C 35/067* (2013.01); *F16C 19/385* (2013.01); *F16C 2229/00* (2013.01); *Y10T 29/49638* (2015.01)

(58) Field of Classification Search
CPC ........ F16C 35/00; F16C 35/06; F16C 35/067; F16C 2229/00
USPC ......... 384/510, 517, 537, 540, 559, 563, 584, 384/585, 627, 903, 538, 562, 583
See application file for complete search history.

(56) References Cited

U.S. PATENT DOCUMENTS

| | | | | |
|---|---|---|---|---|
| 821,322 | A * | 5/1906 | Worrell | F16C 25/06 384/583 |
| 1,399,959 | A * | 12/1921 | Hanson | F16C 25/083 384/517 |
| 1,894,414 | A * | 1/1933 | Olson | 384/538 |
| 2,018,221 | A * | 10/1935 | Mueller | 384/585 |
| 2,147,787 | A * | 2/1939 | Ferguson | 384/540 |
| 2,605,148 | A * | 7/1952 | Shoup | 384/563 |
| 3,510,184 | A * | 5/1970 | Fuhr et al. | 384/517 |
| 5,030,016 | A * | 7/1991 | Schoeffter | 384/448 |
| 7,108,428 | B2 * | 9/2006 | Ason et al. | 384/583 |
| 7,572,061 | B2 * | 8/2009 | Fox et al. | 384/494 |
| 7,794,153 | B2 * | 9/2010 | Szczepanski et al. | 384/583 |

* cited by examiner

*Primary Examiner* — James Pilkington

(57) ABSTRACT

A bearing arrangement includes a housing, a rotating member traversing the housing, a bearing assembly located between the housing and the rotating member and supporting the bearing member, and a retainer in contact with the housing and the bearing assembly. The retainer has positioning means adapted to engage with the housing so that the retainer is moveable to a predetermined position to retain the bearing assembly.

7 Claims, 3 Drawing Sheets

BEARING RETAINER

CROSS-REFERENCE TO RELATED APPLICATIONS

This application claims the benefit of U.K. Patent Application No. GB1300746.3 filed Jan. 16, 2013.

BACKGROUND OF THE INVENTION

The present invention is concerned with bearing assemblies, and in particular with a bearing retainer for retaining a bearing assembly in a housing, particularly for a bearing assembly in a Wind Turbine Generator.

A bearing needs is fitted with a shaft and housing and will have some level of clearance. To remove this internal clearance and create an interference fit, a preload is necessary. The preload is a permanent thrust load is applied to the bearing, and is applied to push the bearing so that it is. Any force that is applied to the shaft is known as preload.

A large majority of bearing failures on wind turbine generator high speed shafts are due to incorrect setting of the bearing. This is due to the design requirements of the gearbox, and the requirement for both accurate measurements of the gearbox and bearing, and the subsequent accurate manufacture of the bearing retainer. In addition, it is difficult to control preload/clearance without the requirement for ambiguous measurements to be taken, or accurate machining exercises.

In order to provide the correct preload/clearance for the bearing, it is required that the bearing retainer be fitted and manufactured specifically for each individual gearbox. These dimensional requirements are difficult to achieve during manufacture and are often impossible to achieve during maintenance, such as for example a nacelle re-work, despite diligent work. The resulting installed bearing therefore has an undetermined preload/clearance and therefore an undetermined life.

There is thus a need for a bearing retainer that can be applied to all gearboxes, of any manufacturer, which can be incorporated into any gearbox during a bearing replacement exercise, and which permits easy preload/clearance changes during the life of the bearing.

Brief Summary of the Invention

According to a first aspect of the invention, there is provided bearing arrangement comprising: a housing; a rotating member traversing the housing; a bearing assembly located between the housing and the rotating member; a retainer in contact with the housing and the bearing assembly, the retainer comprising positioning means adapted to engage with the housing. This means that the retainer is moveable to a predetermined position to retain the bearing assembly. This means that the retainer is moveable to a predetermined position, wherein a preload/clearance is applied to the bearing assembly. The bearing assembly is located in the bearing housing between a rotating member and the main housing, and the retainer comprises sealing means adapted to engage with the rotating member. This means that the retainer is able to form a seal with the rotating member. The retainer comprises a ring-shaped part which has on an outer surface a screw thread configured to engage with a screw thread on the housing. An inner surface of the ring shaped part comprises a seal member configured to seal against the rotating member. The housing includes a cover plate configured to engage with the retainer.

According to a further aspect of the invention, there is provided a method for maintaining a bearing comprising the steps of: disengaging the retainer from the housing; replacing the bearing assembly; engaging the retainer with the housing; and moving the retainer to a predetermined position to retain the bearing assembly.

According to a further aspect of the invention, there is provided a retainer for a bearing assembly, in which the bearing assembly is located in a housing, the retainer comprising: positioning means adapted to engage with the housing. This means that the retainer is moveable to a predetermined position to retain the bearing assembly. The retainer is moveable to a predetermined position to apply a preload or a clearance to the bearing assembly. The retainer comprises a ring-shaped part which has on an outer surface a screw thread configured to engage with a screw thread on the housing. An inner surface of the ring shaped part comprises a seal member configured to seal against the rotating member.

According to further aspects of the invention, there is provided a gearbox comprising the bearing arrangement or the retainer disclosed above and a wind turbine comprising the bearing arrangement or the retainer disclosed above.

BRIEF DESCRIPTION OF THE SEVERAL VIEWS OF THE DRAWING

The present invention will now be described, by way of example only, with reference to the accompanying drawings, in which.

DETAILED DESCRIPTION OF THE INVENTION

Figure 1:
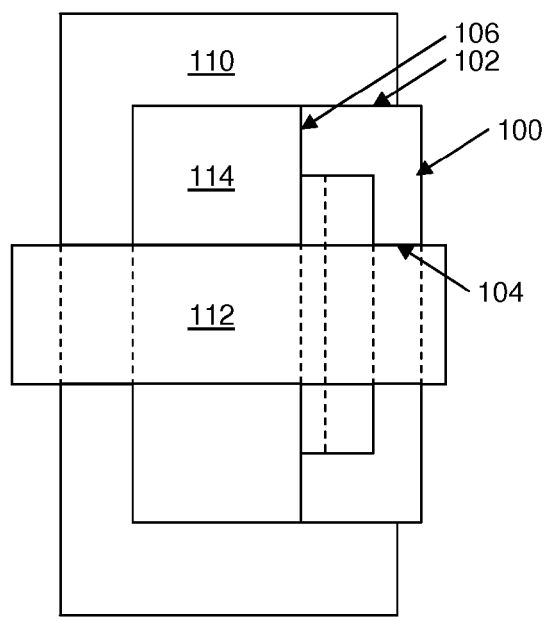
FIG. 1 shows a schematic representation of a bearing retainer of the present invention.

FIG. 1 shows a sectional view a bearing retainer 100 of the present invention. Bearing retainer 100 has a surface 102 for engagement with a housing 110 of a bearing assembly 114, a surface 104 for sealing with a rotating member 112 supported by bearing assembly 114, and a surface 106 for contacting bearing arrangement 114 to retain the bearing assembly in housing 110.

Figure 2A:
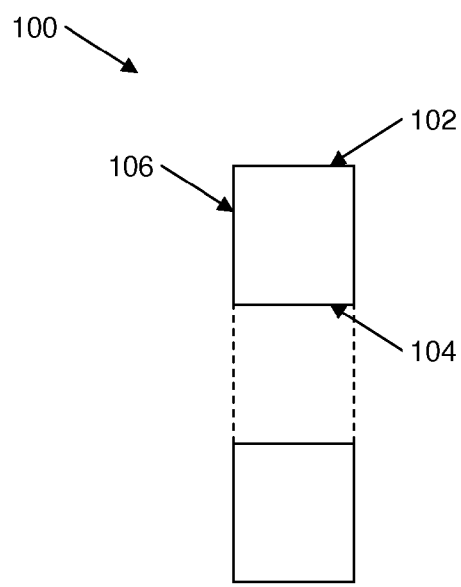
FIGS. 2A and 2B show sectional views of examples of the bearing retainer.
Figure 2B:
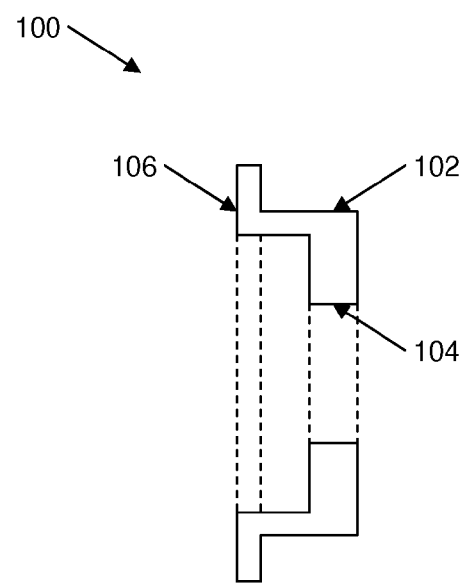

The shape of bearing retainer 100 can be adapted according to the shape and design of bearing housing 110 and bearing arrangement 114, and FIGS. 2A and 2B show sectional views of examples of bearing retainer 100, each having surface 102 for engagement with housing 110 of bearing assembly 114, surface 104 for sealing with rotating member 112 supported by bearing assembly 114, and surface 106 for contacting bearing arrangement 114 to retain the bearing assembly in housing 110.

Figure 3:
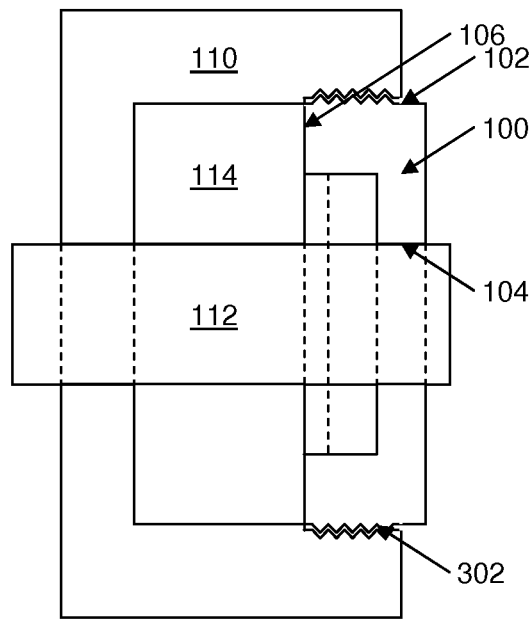
FIG. 3 shows a bearing retainer having a screw thread engaging with a corresponding screw thread on a bearing housing.

Surface 102 for engagement with housing 110 is adapted so as to allow an axial position of bearing retainer 100 to be adjusted relative to housing 110. FIG. 3 shows such an adaptation, in which surface 102 includes a screw thread 302 engaging with a corresponding screw thread 304 on bearing housing 110. Bearing retainer 100 can thus be rotated and then secured to apply the correct preload to bearing assembly 114 and/or to set the correct spacing to retain bearing assembly 114.

Figure 4:
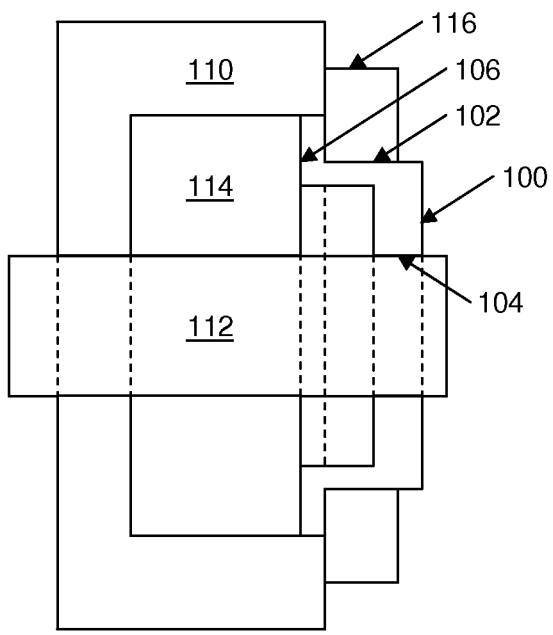
FIG. 4 shows a retainer cover plate allowing indirect engagement between the bearing retainer and the housing.

In the embodiments shown in FIGS. 1 and 3, bearing retainer engages directly with housing 110. In alternative embodiments, examples of which are shown in FIG. 4, housing 110 includes retainer cover plate 116, and bearing retainer 100 engages indirectly with housing 110 via retainer cover plate 116. This means that bearing retainer 100 can be easily incorporated within existing gearboxes as a retrofit option, for example, when bearing arrangement 114 is being replaced.

Retainer cover plate 116 can be attached to the existing geometry of housing 110, for example by means of suitable bolts 508, and retainer 100 is attached to retainer cover plate 116 by positioning means adapted to engage with housing 100. The retainer 100 is moveable to a predetermined position to retain bearing assembly 114. The positioning means can be a screw thread 302 on surface 102, as shown in FIG. 3, and retainer 100 can thus be rotated and then secured to apply the correct preload to bearing assembly 114 or to set the correct spacing.

Figure 5:
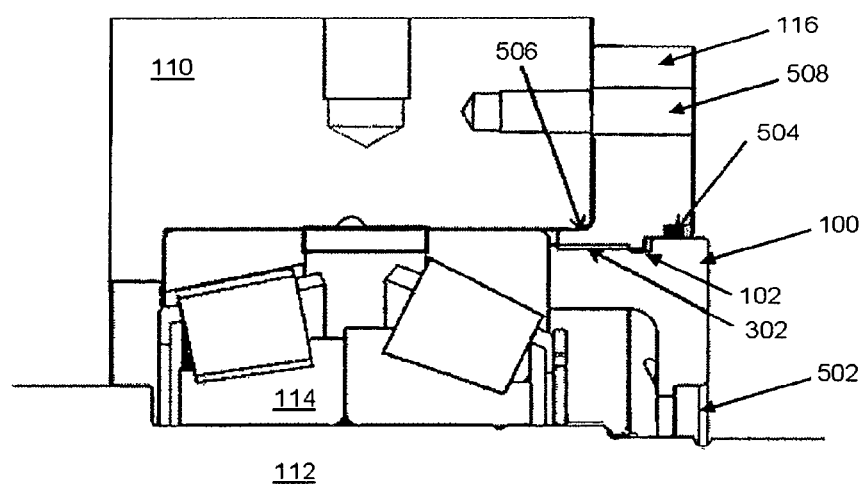
FIG. 5 shows sealing means adapted to engage with the rotating member.

Retainer 100 can further include sealing means 502 on surface 104 adapted to engage with rotating member 112, so that retainer 100 is able to form a seal with rotating member 112, as shown in FIG. 5. The seal can be a labyrinth seal geometry on surface 104. A further sealing means 504 can be included between surface 102 and housing 110 or retainer cover plate 116. Retainer cover plate 116 can include spigot 506 to facilitate engagement between retainer cover plate 116 and housing 110.

Retainer 100 is typically ring-shaped, and the screw thread 302 is located on outer surface 102. Inner surface 104 of the ring shaped part comprises seal member 502 configured to seal against rotating member 112.

Housing 110 can be the housing of a gearbox. The gearbox can be a wind turbine generator gearbox.

Bearing retainer 100 can be used in one of two ways:

When used with a manufacturer supplied bearing spacer, bearing retainer 100 can be torqued to a pre-determined torque (using simple tooling) and then backed-off by a pre-determined angle to give the correct running clearance. Finally bearing retainer can be locked in position by means of, for example, one or more locking mechanisms of the type shown in FIG. 6.

Figure 6:
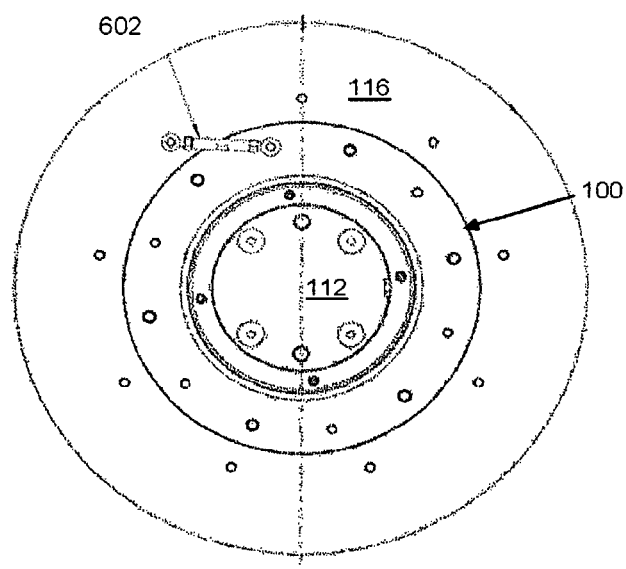
FIG. 6 shows a locking mechanism for securing the bearing retainer in place.

When used without a supplied bearing spacer, bearing retainer 110 can be torqued to a pre-determined torque (again using the same tooling) and then locked in position by means of, for example, one or more locking mechanisms 602 of the type shown in FIG. 6.

The present invention includes a kit comprising bearing retainer 100 and, optionally, cover plate 116.

The present invention includes a method for maintaining bearing arrangement 114 and involves disengaging bearing retainer 100 from housing 110, removing or replacing bearing assembly 112, engaging bearing retainer 110 with housing 110; and moving bearing retainer 100 to a predetermined position to retain bearing assembly 114.

The method also includes the step of attaching cover plate 116 to housing 110 when retrofitting bearing retainer 110 to an existing bearing arrangement.

The invention claimed is:

1. A bearing arrangement for a gearbox comprising:
   a housing;
   a rotating member traversing said housing;
   a bearing assembly located between said housing and said rotating member, said rotating member supported by said bearing assembly;
   a cover plate bolted to said housing; and
   a retainer comprising:
   a surface in contact with said bearing assembly; and
   an outer surface comprising a screw thread;
   wherein said outer surface engages with said cover plate via a screw thread on said cover plate to adjust an axial position of said retainer relative to said housing, wherein said retainer is moveable to apply a preload or a clearance to the bearing assembly.

2. The bearing arrangement of claim 1, wherein said retainer comprising: sealing means adapted to engage with said rotating member.

3. The bearing arrangement of claim 2, wherein said retainer comprises a ring-shaped part.

4. The bearing arrangement of claim 3, wherein an inner surface of said ring shaped part comprises the sealing means.

5. A gearbox comprising a bearing arrangement of claim 1.

6. A wind turbine comprising a bearing arrangement of claim 1.

7. A method for maintaining a bearing arrangement of claim 1 comprising said steps of:
   disengaging said retainer from said housing;
   replacing said bearing assembly;
   engaging said screw thread on said outer surface of said retainer with said screw thread on said cover plate; and
   adjusting an axial position of said retainer to a predetermined position relative to said housing to retain said bearing assembly thereby applying a correct preload or clearance to the bearing assembly.

* * * * *